(12) United States Patent
Chiu et al.

(10) Patent No.: US 12,547,232 B2
(45) Date of Patent: Feb. 10, 2026

(54) CONTROL METHOD AND CIRCUIT UTILIZING THE SAME

(71) Applicant: Nuvoton Technology Corporation, Hsinchu Science Park (TW)

(72) Inventors: Ta-Chin Chiu, Hsinchu Science Park (TW); Chieh-Sheng Tu, Hsinchu Science Park (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 199 days.

(21) Appl. No.: 18/479,955

(22) Filed: Oct. 3, 2023

(65) Prior Publication Data

US 2024/0184346 A1 Jun. 6, 2024

(30) Foreign Application Priority Data

Dec. 2, 2022 (TW) .................................. 111146283

(51) Int. Cl.
| | |
|---|---|
| G06F 11/00 | (2006.01) |
| G06F 1/14 | (2006.01) |
| G06F 1/28 | (2006.01) |
| G06F 1/30 | (2006.01) |
| G06F 3/06 | (2006.01) |

(52) U.S. Cl.
CPC ................ *G06F 1/305* (2013.01); *G06F 1/14* (2013.01); *G06F 1/28* (2013.01); *G06F 3/0679* (2013.01)

(58) Field of Classification Search
CPC .............. G06F 1/30; G06F 1/305; G06F 1/28
See application file for complete search history.

(56) References Cited

U.S. PATENT DOCUMENTS

| | | | | |
|---|---|---|---|---|
| 8,595,532 | B1 * | 11/2013 | Wright ...................... | G06F 1/30 |
| | | | | 713/324 |
| 2007/0159217 | A1 * | 7/2007 | Chan ..................... | H03K 17/223 |
| | | | | 327/77 |
| 2009/0085551 | A1 * | 4/2009 | Barrenscheen ....... | G06F 1/3296 |
| | | | | 323/318 |
| 2017/0060668 | A1 * | 3/2017 | Farhan ................ | G06F 12/0871 |
| 2017/0214399 | A1 * | 7/2017 | Zogopoulos .......... | G06F 1/3206 |

(Continued)

FOREIGN PATENT DOCUMENTS

| | | |
|---|---|---|
| CN | 110021978 A | 7/2019 |
| CN | 111465910 A | 7/2020 |

(Continued)

*Primary Examiner* — Philip Guyton
(74) *Attorney, Agent, or Firm* — MUNCY, GEISSLER, OLDS & LOWE, P.C.

(57) ABSTRACT

A control method executing a power-off detection operation is provided. An operation voltage provided by a power circuit is detected. In response to the operation voltage being equal to the first detection value, the count value is adjusted. In response to the operation voltage being equal to the second detection value, the first detection value, the second detection value, and the count value are calculated to generate a first slope. A first power-off speed at which the operation voltage drops to the reset voltage is estimated according to the first slope. In a test mode, the first power-off speed is output to a test machine. The test machine determines whether the power circuit is working normally according to the first power-off speed.

18 Claims, 5 Drawing Sheets

(56) References Cited

U.S. PATENT DOCUMENTS

| | | | |
|---|---|---|---|
| 2018/0067532 A1* | 3/2018 | Chuang | G06F 1/324 |
| 2018/0067541 A1* | 3/2018 | Chuang | G06F 1/305 |
| 2019/0042156 A1* | 2/2019 | De Santis | G06F 3/0604 |
| 2020/0001887 A1* | 1/2020 | Srivastava | B60W 50/0205 |
| 2020/0257352 A1 | 8/2020 | Hanson et al. | |
| 2023/0223988 A1* | 7/2023 | Arduini | G06F 1/305 |
| | | | 713/300 |
| 2023/0333619 A1* | 10/2023 | Lai | G06F 1/28 |
| 2024/0085967 A1* | 3/2024 | Gandhi | G06F 1/08 |
| 2024/0184346 A1* | 6/2024 | Chiu | G06F 1/28 |

FOREIGN PATENT DOCUMENTS

| | | |
|---|---|---|
| TW | I534598 B | 5/2016 |
| TW | 201714065 A | 4/2017 |
| TW | I688187 B | 3/2020 |

\* cited by examiner

CONTROL METHOD AND CIRCUIT UTILIZING THE SAME

CROSS REFERENCE TO RELATED APPLICATIONS

This application claims priority of Taiwan Patent Application No. 111146283, filed on Dec. 2, 2022, the entirety of which is incorporated by reference herein.

BACKGROUND OF THE INVENTION

Field of the Invention

The present invention relates to control method, and, in particular, to a control method that estimates the drop speed of an operation voltage.

Description of the Related Art

Electronic devices generally operate according to an operation voltage. When the operation voltage suddenly disappears or drops, the electronic devices do not work normally. The data or set values stored in the electronic devices may also suddenly disappear.

BRIEF SUMMARY OF THE INVENTION

A control method is provided. An exemplary embodiment of a control method is described in the following paragraph. An operation voltage provided by a power circuit is detected. A determination is made as to whether the operation voltage is equal to a first detection value. In response to the operation voltage being equal to the first detection value, a count value is adjusted. A determination is made as to whether the operation voltage is equal to a second detection value. In response to the operation voltage being equal to the second detection value, the first detection value, the second detection value, and the count value are calculated to generate a first slope. A first power-off speed at which the operation voltage drops to a reset voltage according to the first slope is estimated. In a test mode, the first power-off speed is output to a test machine. The test machine determines whether the power circuit is working normally according to the first power-off speed.

In accordance with an embodiment of the disclosure, a control circuit comprises a detection circuit, a counter circuit, a calculation circuit, and a processing circuit. The detection circuit detects an operation voltage. The counter circuit adjusts the count value in response to the operation voltage being equal to the first detection value. The counter circuit latches the count value in response to the operation voltage being equal to the second detection value. The calculation circuit calculates the first detection value, the second detection value, and the count value to generate a first slope in response to the operation voltage being equal to the second detection value. The calculation circuit estimates the power-off speed at which the operation voltage drops to the reset voltage according to the first slope. The processing circuit outputs the power-off speed to a test machine in a test mode. The test machine determines whether a power circuit is working normally according to the power-off speed. The power circuit provides the operation voltage.

Control methods may be practiced by the control circuit which have hardware or firmware capable of performing particular functions and may take the form of program code embodied in a tangible media. When the program code is loaded into and executed by an electronic device, a processor, a computer or a machine, the electronic device, the processor, the computer or the machine becomes a control circuit for practicing the disclosed method.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
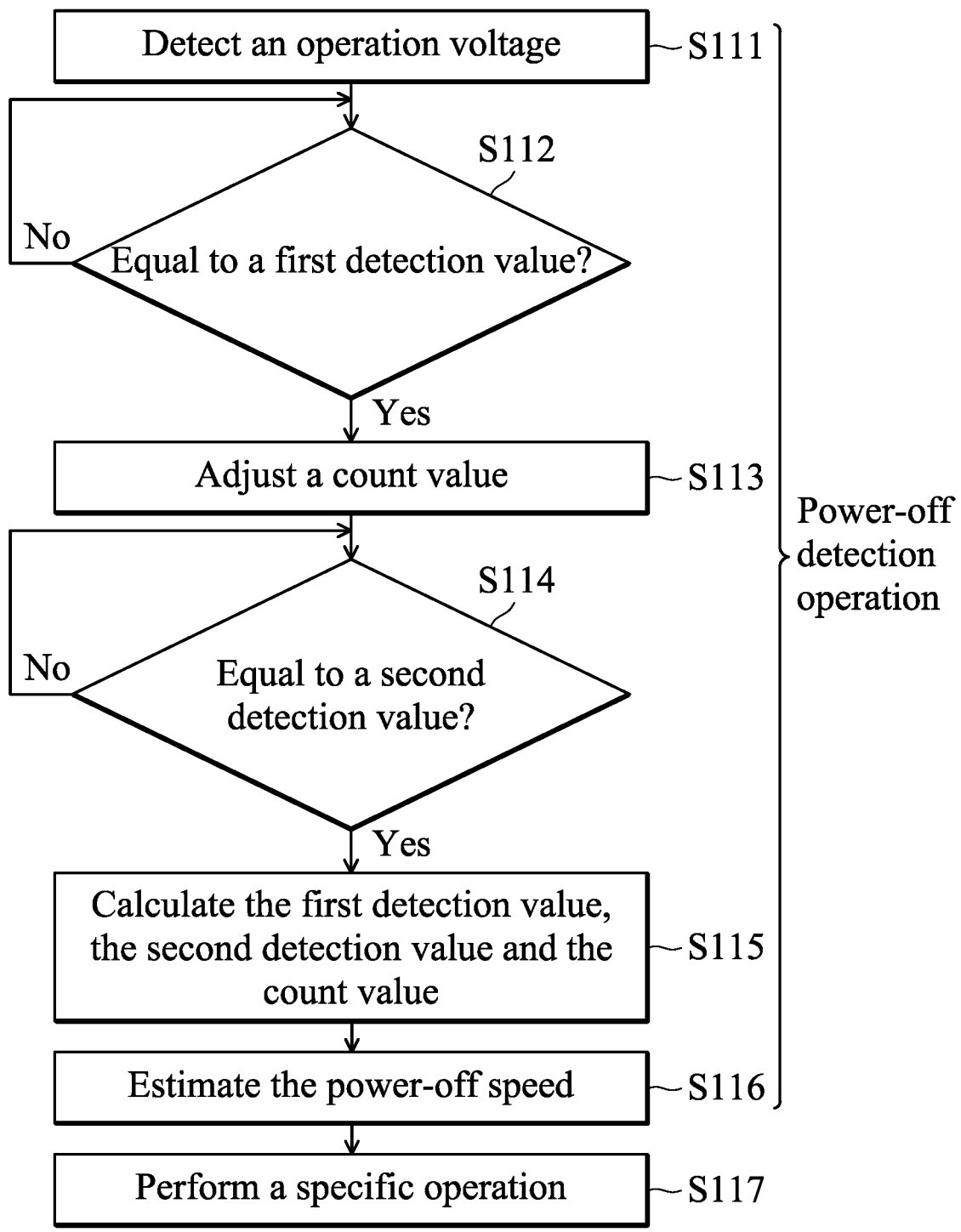
FIG. 1 is a flowchart of an exemplary embodiment of a control method according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1 is a flowchart of an exemplary embodiment of a control method according to various aspects of the present disclosure. The control method executes a power-off detection operation to estimate the time it takes for an operation voltage dropping to a reset voltage. In one embodiment, the operation voltage is used by a micro-controller. When the time it takes for an operation voltage dropping to the reset voltage is enough to perform an update operation, the micro-controller performs the update operation. When the time it takes for an operation voltage dropping to the reset voltage is not enough to perform an update operation, the micro-controller performs a reset operation. In one embodiment, the update operation writes update data to a non-volatile memory, such as a flash memory. Furthermore, the reset operation may reset the value of one or more registers.

As shown in FIG. 1, the power-off detection operation comprises steps S111~S116. First, an operation voltage is detected (step S111). In one embodiment, the operation voltage is provided by a power circuit. In this case, the power circuit may convert the mains power, use the converted power as the operation voltage, and provide the operation voltage to the micro-controller. The micro-controller starts to operate when it receives the operation voltage.

Next, a determination is made as to whether the operation voltage is equal to a first detection value (step S112). When the operation voltage is not equal to the first detection value, step S112 is performed to again determine whether the operation voltage is equal to the first detection value. When the operation voltage is equal to the first detection value, the count value is adjusted (step S113). In one embodiment, when the operation voltage is equal to the first detection value, the value of a first interruption flag is set to a specific value, such as 1. In this case, when the value of the first interruption flag is equal to the specific value, a counter is initialized and started. The counter starts to adjust the count value. When the operation voltage is not equal to the first detection value, the value of the first interruption flag is equal to another value, such as 0. In this case, the counter does not work. In some embodiments, when the operation voltage gradually reduces and arrives to the first detection value, the value of the first interruption flag is set to the specific value. In some embodiments, the operation voltage may continue to reduce. At this time, even if the operation voltage is not equal to the first detection value, the value of the first interruption flag is maintained to the specific value.

Next, a determination is made as to whether the operation voltage is equal to a second detection value (step S114). When the operation voltage is not equal to the second detection value, step S114 is performed to continue determine whether the operation voltage is equal to the second detection value. In some embodiments, the second detection value is lower than the first detection value. For example, the operation voltage is 5V. In this case, the first detection value may be 4.4V, and the second detection value may be 3.7V.

When the operation voltage is equal to the second detection value, the first detection value, the second detection value and the count value are calculated to generate a slope (step S115). In one embodiment, when the operation voltage is equal to the second detection value, the value of a second interruption flag is set to a specific value, such as 1. In this case, when the value of the second interruption flag is equal to the specific value, the count value does not be adjusted and the counter value is latched. Since the feature of the second interruption flag is the same as the feature of the first interruption flag, the feature of the second interruption flag is omitted.

The present disclosure does not limit how the first detection value, the second detection value and the count value are calculated. In one embodiment, the slope is expressed by the following equation:

$$SP=(V1-V2)/CT,$$

Wherein SP represents the slope, V1 represents the first detection value, V2 represents the second detection value, and CT represents the time corresponding to the count value.

The power-off speed at which the operation voltage drops to the reset voltage is estimated according to the slope (step S116). In one embodiment, the reset voltage is lower than the second detection value. For example, the reset voltage may be 2.4V. Next, a specific operation is executed (step S117). The specific operation is not limited in the present disclosure. When the power-off detection operation is executed in different phases, step S117 executes different specific operations.

For example, the power-off detection operation is executed in a test phase. In this case, the micro-controller may operate in a test phase during the setting and production process of the micro-controller before leaving the factory. In the test phase, the micro-controller executes the power-off detection operation to obtain the power-off characteristics of the operating voltage. At this time, the slope generated in step S115 is referred to as a first slope. The power-off speed generated in step S116 is referred to as a first power-off speed. In this case, in step S117, the first power-off speed is provided to a test machine. The test machine compares the first power-off speed with a reference speed to determine whether the first power-off speed is normal. When the first power-off speed is not normal (e.g., too fast), this indicates that the power circuit providing the operation voltage is abnormal.

In another embodiment, after the micro-controller is shipped from the factory, when the operation voltage drops, the micro-controller executes the power-off detection operation to predict that the length of time for the operating voltage to drop to a reset voltage. The micro-controller executes a corresponding operation according to the length of time for the operating voltage to drop to the reset voltage. In this case, the slope generated from step S115 is referred to as a second slope, and the power-off speed generated from step S116 is referred to as a second power-off speed. In the specific operation in step S117, the second power-off speed is compared with the predetermined power-off speed. When the second power-off speed is lower than the predetermined power-off speed, a reset operation is executed on the micro-controller. When the second power-off speed is higher than the predetermined power-off speed, a plurality of set values regarding the operation of the micro-controller are stored.

In one embodiment, the predetermined power-off speed is written in the micro-controller in advance. In this case, before the micro-controller is shipped from the factory, the designer writes a predetermined power-off speed into the micro-controller. Therefore, the micro-controllers from the same batch have the same predetermine power-off speed. In another embodiment, before the micro-controller leaves the factory, the micro-controller performs the power-off detection operation to obtain a first power-off speed. In this case, the micro-controller stores the first power-off speed, which serves as the predetermined power-off speed. Therefore, the micro-controllers from the same batch may have different predetermined power-off speeds. In this case, the predetermined power-off speed stored in the micro-controller conforms to the characteristics of the power circuit inside the corresponding micro-controller.

In other embodiment, a first slope is calculated in step S115. In this case, the counter continues to adjust the count value. When the operation voltage arrives a third detection value, the count value and at least two of the first detection value, the second detection value, and the third detection value are calculated to obtain a second slope. The length of time for the operating voltage to drop to a reset voltage is estimated according to the first slope and the second slope. In one embodiment, the third detection value is lower than the second detection value and higher than the reset voltage. For example, the second detection value may be 3.7V and the third detection value may be 3V.

When the mains power is unstable or there is a power outage, the operation voltage may gradually drop. Additionally, when the power circuit is abnormal (e.g., the internal capacitor aging), the operation voltage also drops. Therefore, the speed of operation voltage drop may be different from the test value of the power circuit before leaving the factory. However, in the process of operation voltage drop, the time point when the operation voltage drops to the reset voltage is estimated in advance according to the time points when the operation voltage drops to different detection values. Therefore, data can be recorded before it is lost due to power outage.

Figure 2:
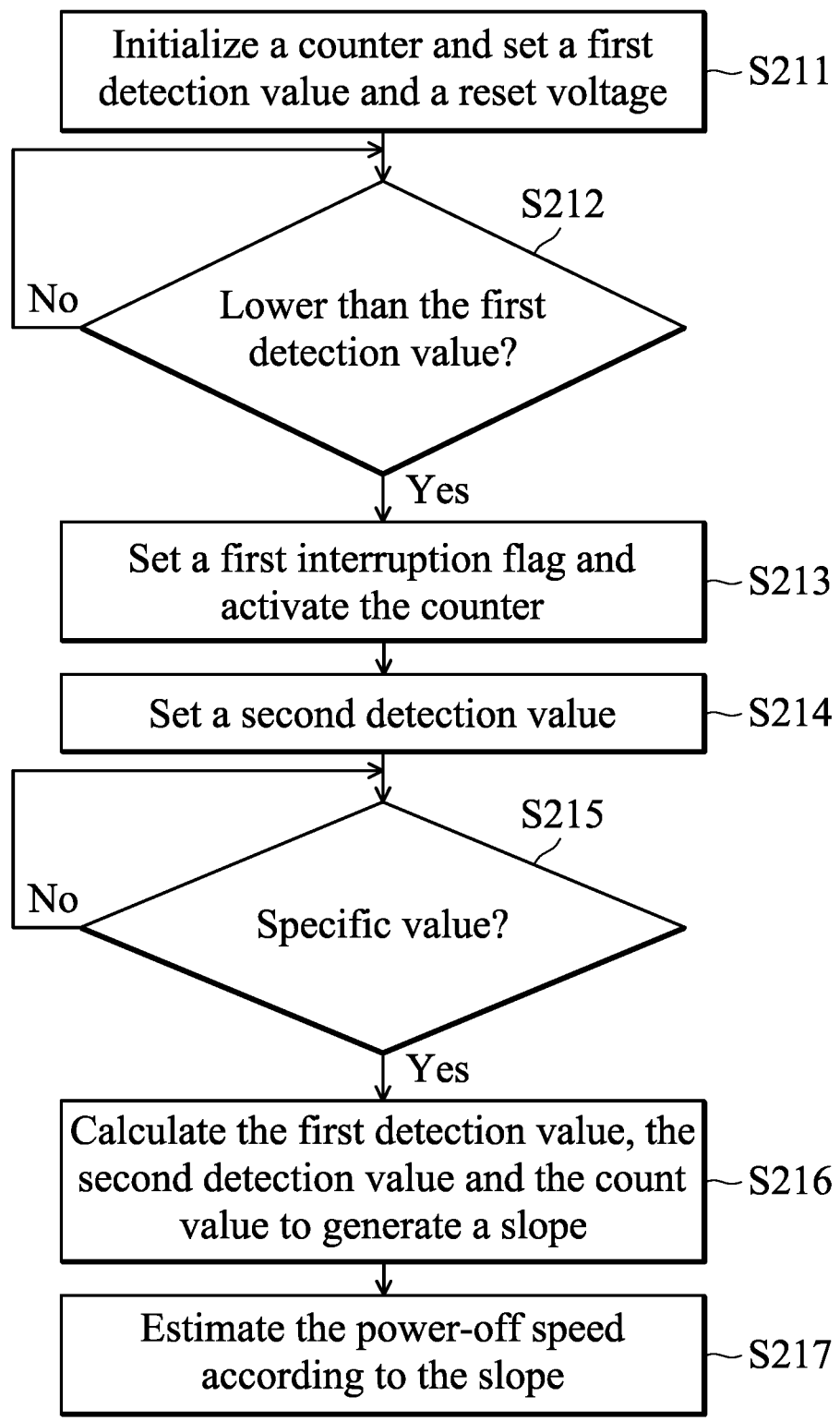
FIG. 2 is a schematic diagram of an exemplary embodiment of a power-off detection operation according to various aspects of the present disclosure.

FIG. 2 is a schematic diagram of an exemplary embodiment of the power-off detection operation according to various aspects of the present disclosure. A counter is initialized and a first detection value and a reset voltage are set (step S211). In some embodiments, the operation voltage is detected in step S211.

Then, a determination is made as to whether the operation voltage is lower than the first detection value (step S212). When the operation voltage is not lower than the first detection value, step S212 may be performed to determine whether the operation voltage is lower than the first detection value. When the operation voltage is lower than the first detection value, the value of a first interruption flag is set to a specific value and the counter is activated (step S213). Therefore, the counter starts to adjust the count value.

Next, a second detection value is set (step S214). In one embodiment, when the operation voltage is lower than the first detection value, since the value of the first interruption flag is the same as the specific value, a CPU in the microcontroller executes an interrupt subroutine to set the second detection value.

The, a determination is made as to whether the value of a second interruption flag is equal to the specific value (step S215). In one embodiment, when the operation voltage is lower than the second detection value, the value of the second interruption flag is set to the specific value. Therefore, by judging the value of the second interruption flag, it can be known whether the operating voltage is lower than the second detection value. However, when the value of the second interruption flag is different from the specific value, this indicates that the operation voltage is not lower than the second detection value. Therefore, step S215 is performed to determine whether the value of the second interruption flag is equal to the specific value.

When the value of the second interruption flag is equal to the specific value, the counter stops adjusting the count value and the first detection value, the second detection value and the count value are calculated to generate a slope (step S216). Since the characteristics of step S216 shown in FIG. 2 are similar to the characteristics of step S115 shown in FIG. 1, the related description is omitted here.

Then, the power-off speed at which the operation voltage drops to the reset voltage is estimated according to the slope (step S217). Since the characteristics of step S217 shown in FIG. 2 are similar to the characteristics of step S116 shown in FIG. 1, the related description is omitted here.

Figure 3:
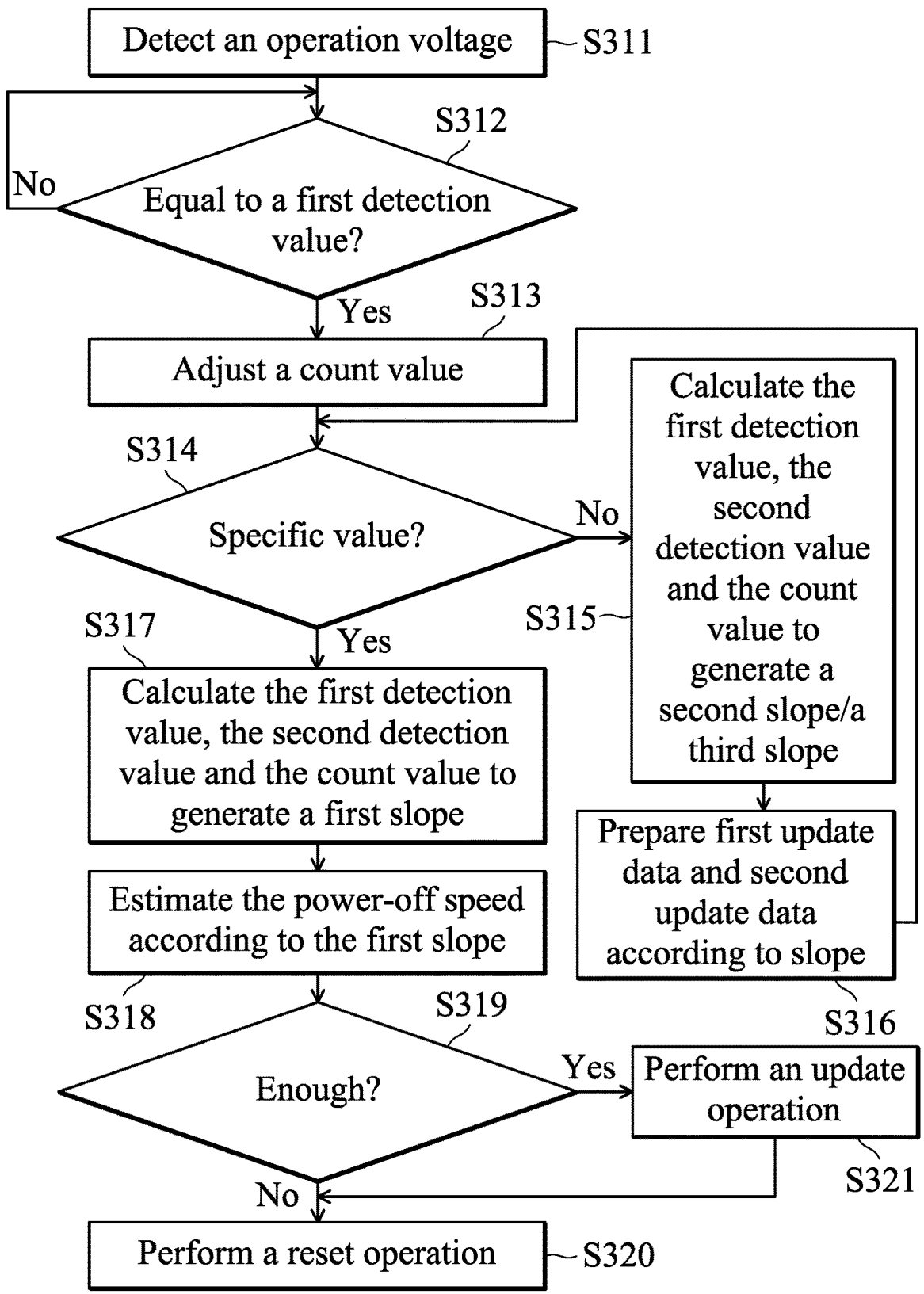
FIG. 3 is a flowchart of another exemplary embodiment of the control method according to various aspects of the present disclosure.

FIG. 3 is a flowchart of another exemplary embodiment of the control method according to various aspects of the present disclosure. First, an operation voltage is detected (step S311). In some embodiments, in step S311, the counter is initialized and the detection value and the reset voltage are set. Since the characteristics of step S311 shown in FIG. 3 are similar to the characteristics of step S111 shown in FIG. 1 and/or step S211 shown in FIG. 2, the related description is omitted here.

Next, a determination is made as to whether the operation voltage is equal to a first detection value (step S312). When the operation voltage is not equal to the first detection value, step S312 is performed to determine whether the operation voltage is equal to the first detection value. When the operation voltage is equal to the first detection value, a count value is adjusted (step S313). In some embodiments, when the operation voltage is equal to the first detection value, the value of a first interruption flag is set to a specific value, such as 1. Since the characteristics of step S313 shown in FIG. 3 are similar to the characteristics of step S112 shown in FIG. 1 or step S212 shown in FIG. 2, the related description is omitted here.

Then, a determination is made as to whether the value of a second interruption flag is equal to the specific value (step S314). In one embodiment, when the operation voltage is lower than the second detection value, the value of the second interruption flag is set to the specific value. When the operation voltage is not lower than the second detection value, the value of the second interruption flag is not set to the specific value. Therefore, step S315 is performed to access the count value and calculate the first detection value, the second detection value, and the count value such that a slope (referred to as a second slope) is generated.

First update data is generated according to the second slope (step S316) and step S314 is performed to determine whether the value of the second interruption flag is equal to the specific value. When the value of the second interruption flag is not equal to the specific value, the count value is re-accessed and the first detection value, the second detection value, and the count value are calculated to generate another slope (referred to as a third slope). Next, second update data is generate according to the third slope (step S316).

In one embodiment, a specific memory (referred to as the second memory) is accessed in step S316 to generate the first update data and the second update data. The kind of specific memory is not limited in the present disclosure. The specific memory may be a volatile memory, such as a static random access memory (SRAM).

In other embodiments, the amount of first update data and the amount of second update data are related to the second slope and the third slope generated in step S315. For example, when the third slope is lower than the second slope, this indicates that the drop speed of the operation voltage is slow. Therefore, the amount of second update data is more than the amount of first update data. When the third slope is higher than the second slope, this indicates that the drop speed of the operation voltage is fast. Therefore, the amount of second update data is less than the amount of first update data.

In some embodiments, the number of pieces of update data generated in step S316 is related to the drop speed of the operation voltage. When the drop speed of the operation voltage is slow, more pieces of update data are provided in step S316, wherein the amount of update data in one piece may be the same as or different from the amount of update data in the other piece. When the drop speed of the operation voltage is fast, step S316 is performed to provide fewer pieces of update data.

When the value of the second interruption flag is equal to the specific value, the count value of the counter is read and the first detection value, the second detection value, and the count value are calculated to generate a slope (step S317). In one embodiment, step S317 is performed to calculate the difference between the first detection value and the second detection value and to convert the count value into a count time. In this case, step S317 is performed to divide the difference between the first detection value and the second detection value by the count time to generate a calculation result. In step S317, the calculation result is served as the slope. Since the characteristics of step S317 shown in FIG. 3 are similar to the characteristics of step S115 shown in FIG. 1, the related description is omitted here.

Next, the power-off speed at which the operation voltage drops to the reset voltage is estimated according to the slope (step S318). Since the characteristics of step S318 shown in FIG. 3 are similar to the characteristics of step S116 shown in FIG. 1, the related description is omitted here.

Then, a determination is made as to whether the power-off speed is enough for the execution of an update operation (step S319). In one embodiment, step S319 is performed to compare the power-off speed generated in step S318 with the predetermined power-off speed. When the power-off speed (e.g., 5 ms) generated in step S318 is lower than the predetermined power-off speed (e.g., 10 ms), this indicates that the power-off speed of the operation voltage is fast so there is not enough time to complete the update operation. Therefore, a reset operation is performed (step S320). However, when the power-off speed (e.g., 20 ms) generated in step S318 is not lower than the predetermined power-off speed (e.g., 10 ms) indicates that the power-off speed of the operation voltage is enough to complete the update operation. Therefore, an update operation is performed (step S320). In some embodiments, the update operation is performed to write the first update data and the second update data generated in step S316 to a memory (referred to as the first memory). In this embodiment, the first memory is a non-volatile memory.

In some embodiments, a specific operation comprises steps S315, S316, and S319~S321. The micro-controller performs the specific operation under a normal operation. In this case, the normal operation means all operations of the micro-controller after leaving the factory. Since step S316 prepares update data in advance, the time of storing data is reduced in step S321.

Figure 4:
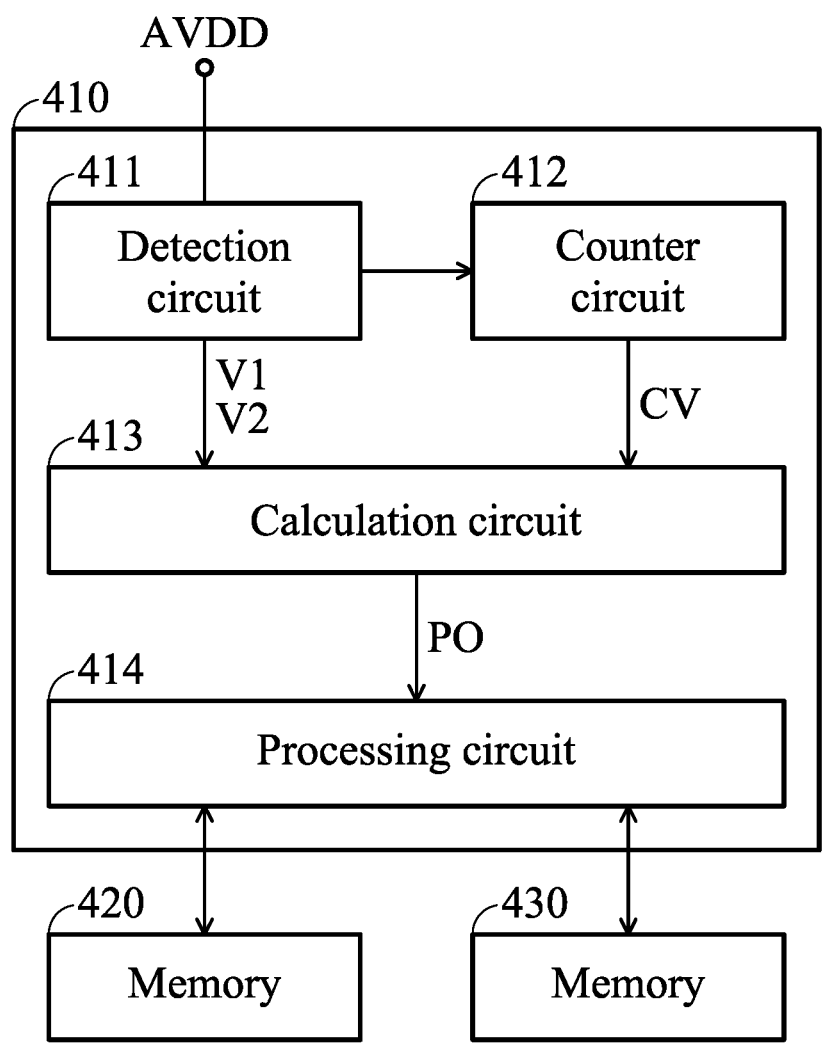
FIG. 4 is a schematic diagram of an exemplary embodiment of a control system according to various aspects of the present disclosure.

FIG. 4 is a schematic diagram of an exemplary embodiment of a control system according to various aspects of the present disclosure. The control system 400 comprises a control circuit 410 and memories 420 and 430. In this embodiment, the memories 420 and 430 are independent from the control circuit 410, but the disclosure is not limited thereto. In other embodiment, at least one of the memories 420 and 430 is combined in the control circuit 410. Furthermore, the kinds of memories 420 and 430 are not limited in the present disclosure. In one embodiment, the memory 420 is a non-volatile memory, such as a flash memory. In this case, the memory 430 may be a volatile memory, such as a SRAM.

The control circuit 410 receives an operation voltage AVDD and accesses the memories 420 and 430. In one embodiment, the operation voltage AVDD is provided by a power circuit (not shown). In this case, the power circuit may convert the mains power to generate the operation voltage AVDD. In some embodiments, the power circuit is independent from the control circuit 410. In some embodiments, the control circuit 410 is a micro-controller, such as an MCU. In this embodiment, the control circuit 410 comprises a detection circuit 411, a counter circuit 412, a calculation circuit 413, and a processing circuit 414.

The detection circuit 411 detects the operation voltage AVDD. The structure of detection circuit 411 is not limited in the present disclosure. Any circuit can serve as the detection circuit 411, as long as the circuit is capable of detecting voltage. In some embodiments, the operation voltage AVDD is the operation voltage of at least one circuit disposed in the control circuit 410. For example, after the processing circuit 414 receives the operation voltage AVDD, when a trigger event occurs, the processing circuit 414 starts to operate, such as to estimate the length of time for the operating voltage AVDD to drop to the reset voltage. The operating principle of the processing circuit 414 is described in the following paragraphs.

In some embodiments, when the mains power is cut off, the operation voltage AVDD gradually drops. When the operation voltage AVDD drops and arrives to a detection value V1, the detection circuit 411 asserts a first output signal (not shown) to write a specific value to a first interruption flag (not shown). When the operation voltage AVDD continues to drop and arrives to a detection value V2, the detection circuit 411 asserts a second output signal (not shown) to write a specific value to a second interruption flag (not shown). In this case, the detection value V2 is lower than the detection value V1.

The counter circuit 412 comprises a count value CV. When the operation voltage AVDD is equal to the detection value V1, the counter circuit 412 starts to adjust the count value CV. When the operation voltage AVDD is equal to the detection value V2, the counter circuit 412 latches the count value CV. The structure of counter circuit 412 is not limited in the present disclosure. In one embodiment, the counter circuit 412 may be a counter or a timer.

In some embodiments, when the operation voltage AVDD is equal to the first detection value V1, the detection circuit 411 triggers the counter circuit 412. Therefore, the counter circuit 412 resets the count value CV and then starts to adjust the count value CV. When the operation voltage AVDD is equal to the second detection value V2, the detection circuit 411 disables the counter circuit 412. Therefore, the counter circuit 412 stops adjusting the count value CV.

The calculation circuit 413 generates a first slope according to the first detection value V1, the second detection value V2, and the count value CV. The calculation circuit 413 estimates the power-off speed PO at which the operation voltage AVDD drops to the reset voltage according to the first slope. In one embodiment, the reset voltage is lower than the detection value V2. In another embodiment, the reset voltage is a predetermined value and stores in the calculation circuit 413 in advance.

The present disclosure does not limit how the calculation circuit 413 calculates the detection values V1 and V2, the count value CV. In one embodiment, the calculation circuit 413 calculates the difference between the detection values V1 and V2 and converts the count value CV to a count time. In this case, the calculation circuit 413 divides the difference between the detection values V1 and V2 by the count time to generate a calculation result. The calculation circuit 413 uses the calculation result as the first slope.

The present disclosure does not limit how the calculation circuit 413 calculates the detection values V1 and V2, the count value CV. In one embodiment, the calculation circuit 413 calculates the detection values V1 and V2, and the count value CV according to the values of the first and second interruption flags. For example, when the value of the first interruption flag is not equal to a specific value, this indicates that the operation voltage AVDD has not reached the detection value V1. Therefore, the calculation circuit 413 stops operating. When the value of the first interruption flag is equal to a specific value, this indicates that the operation voltage AVDD reaches the detection value V1. At this time, if the value of the second interruption flag is not equal to the specific value, it means that the operation voltage AVDD has not reached the detection value V2. Therefore, the calculation circuit 413 stops operating. When the values of the first and second interruption flags are equal to the specific value, this indicates that the operation voltage AVDD has reached the detection value V2. Therefore, the calculation circuit 413 starts to calculate the detection values V1 and V2, and the count value CV.

The processing circuit 414 receives the power-off speed PO. In one embodiment, when the control circuit 410 operates in a test mode (e.g., to execute test procedures before leaving the factory), the processing circuit 414 directly outputs the power-off speed PO to a test machine. In this case, the test machine determines whether the power circuit providing the operation voltage AVDD is working normally according to the power-off speed PO. In another embodiment, when the control circuit 410 operates in a normal mode (e.g., to execute all operations after leaving the factory) and the operation voltage AVDD drops, the processing circuit 414 determines whether the power-off speed PO is slower than the predetermined power-off speed. The predetermined power-off speed may be the power-off speed generated by the calculation circuit 413 when the control circuit 410 operates in the test mode.

When the power-off speed PO is not slower than the predetermined power-off speed, the processing circuit 414 updates the memory 420. In one embodiment, the processing circuit 414 moves a portion of data stored in the memory 430 to the memory 420. When the power-off speed PO is slower than the predetermined power-off speed, the processing circuit 414 performs a reset operation. The reset operation may reset at least one register of the control circuit 410.

In other embodiments, when the value of the first interruption flag is the same as a specific value and the value of the second interruption flag is different from the specific value, this indicates that the operation voltage AVDD is within the detection values V1 and V2. At this time, the calculation circuit 413 calculates the detection values V1 and V2, and the count value CV to generate a second slope. The processing circuit 414 accesses the memory 430 to generate first update data according to the second slope. In this case, the calculation circuit 413 re-calculates the detection values V1 and V2, and the count value CV to generate a third slope. The processing circuit 414 accesses the memory 430 to generate second update data according to the third slope. When the value of the second interruption flag is the same as the specific value, this indicates that the operation voltage AVDD has reached the second detection value V2. Therefore, the calculation circuit 413 generates the power-off speed PO to the processing circuit 414. The processing circuit 414 accesses the memory 420 according to the power-off speed PO. In one embodiment, when the power-off speed PO is larger than the predetermined power-off speed, the processing circuit 414 writes the first update data and the second update data into the memory 420.

In some embodiments, the amounts of the first update data and the second update data are related to the second slope and the third slope. For example, when the third slope is less than the second slope, the amount of first update data is more than the amount of second update data. When the third slope is larger than the second slope, the amount of first update data is less than the amount of second update data.

Figure 5:
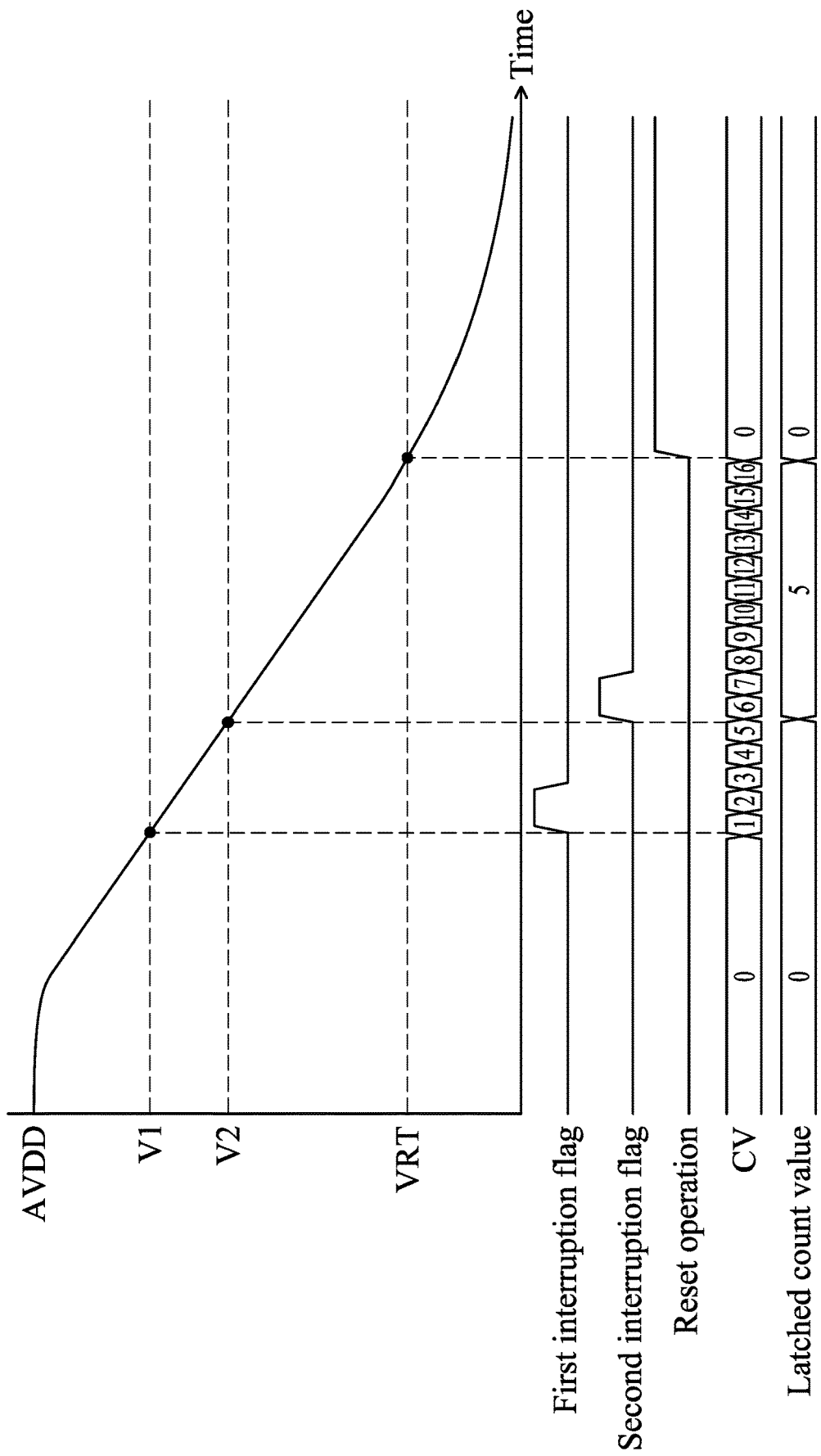
FIG. 5 is a schematic diagram of an exemplary embodiment of an operation voltage according to various aspects of the present disclosure.

FIG. 5 is a schematic diagram of an exemplary embodiment of the operation voltage according to various aspects of the present disclosure. As shown in FIG. 5, the operation voltage AVDD gradually drops. When the operation voltage AVDD reaches the detection value V1, a first interruption flag is triggered. Therefore, the value of the first interruption flag is changed from a first value (e.g., 0) to a second value (e.g., 1). At this time, the counter circuit 412 starts to adjust the count value CV.

When the operation voltage AVDD reaches the detection value V2, a second interruption flag is triggered. Therefore, the value of the second interruption flag is changed from a first value (e.g., 0) to a second value (e.g., 1). At this time, the counter circuit 412 latches the count value CV. Therefore, the count value CV is equal to 5.

In one embodiment, when the operation voltage AVDD reaches the detection value V2, the counter circuit 412 continues to adjust the count value CV until the operation voltage AVDD reaches the reset voltage VRT. In this case, when the operation voltage AVDD reaches the reset voltage VRT, a reset operation is executed. The reset operation may reset the count value CV.

The drop slope of the operation voltage AVDD is obtained according to the time points at which the operation voltage AVDD drops to the first detection value and the second detection value. The drop slope is utilized to estimate the length of time for the operating voltage AVDD to drop to the reset voltage VRT. After obtaining the length of time, important data can stored in a non-volatile memory before the operation voltage AVDD reaches the reset voltage VRT. Additionally, during the process of operating voltage drop, update data is prepared in advance such that the time for data to be written into the volatile memory can shorten.

Control methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes a control circuit for practicing the control methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes a control circuit for practicing the disclosed methods. When implemented on a general-purpose processor, the program code combines with the processor to provide a unique apparatus that operates analogously to application-specific logic circuits.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. It will be understood that although the terms "first," "second," etc. may be used herein to describe various elements, these elements should not be limited by these terms. These terms are only used to distinguish one element from another.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control method comprising:
   executing a power-off detection operation comprising:
      detecting an operation voltage which is provided by a power circuit;
      determining whether the operation voltage is equal to a first detection value;
      adjusting a count value in response to the operation voltage being equal to the first detection value;
      determining whether the operation voltage is equal to a second detection value;
      calculating the first detection value, the second detection value, and the count value to generate a first slope in response to the operation voltage being equal to the second detection value; and estimating a first power-off speed at which the operation voltage drops to a reset voltage according to the first slope;

outputting the first power-off speed to a test machine in a test mode;

executing the power-off detection operation to generate a second slope;

estimating a second power-off speed at which the operation voltage drops to the reset voltage according to the second slope;

comparing the second power-off speed and a predetermined power-off speed;

executing a reset operation on a micro-controller in response to the second power-off speed being slower than the predetermined power-off speed; and storing a plurality of set values regarding the operation of the micro-controller in response to the second power-off speed not being lower than the predetermined power-off speed, wherein the test machine determines whether the power circuit is working normally according to the first power-off speed, and the micro-controller operates according to the operation voltage.

2. The control method as claimed in claim 1, further comprising:

setting a value of a first interruption flag to a specific value in response to the operation voltage being equal to the first detection value;

starting to adjust the count value in response to the value of the first interruption flag being equal to the specific value;

setting a value of a second interruption flag to the specific value in response to the operation voltage being equal to the second detection value; and latching the count value and stopping the adjustment of the count value in response to the value of the second interruption flag being equal to the specific value.

3. The control method as claimed in claim 2, further comprising:

reading the count value in response to the operation voltage being within the first detection value and the second detection value;

calculating the first detection value, the second detection value, and the count value to generate a third slope;

generating first update data according to the third slope, wherein the first update data is stored in a first memory in response to the second power-off speed being higher than the predetermined power-off speed.

4. The control method as claimed in claim 3, further comprising:

after the first update data is generated:

determining the value of the second interruption flag;

reading the count value in response to the value of the second interruption flag not being equal to the specific value;

calculating the first detection value, the second detection value, and the count value to generate a fourth slope; and generating second update data according to the fourth slope, wherein the second update data is stored in the first memory in response to the second power-off speed being higher than the predetermined power-off speed.

5. The control method as claimed in claim 4, wherein:

in response to the fourth slope being less than the third slope, the amount of second update data is more than the amount of first update data; and in response to the fourth slope being higher than the third slope, the amount of second update data is less than the amount of first update data.

6. The control method as claimed in claim 4, further comprising:

accessing a second memory to generate the first update data and the second update data, wherein the second memory is a volatile memory, and the first memory is a non-volatile memory.

7. The control method as claimed in claim 1, further comprising:

serving the first power-off speed as the predetermined power-off speed.

8. The control method as claimed in claim 1, wherein the step of calculating the first detection value, the second detection value, and the count value to generate the first slope comprises:

calculating a difference between the first detection value and the second detection value;

converting the count value to a count time; and dividing the difference by the count time to generate a calculation result which serves as the first slope.

9. The control method as claimed in claim 1, wherein the first detection value is higher than the second detection value, and the second detection value is higher than the reset voltage.

10. A control circuit comprising:

a detection circuit detecting an operation voltage;

a counter circuit adjusting a count value in response to the operation voltage being equal to a first detection value, and latching the count value in response to the operation voltage being equal to a second detection value;

a calculation circuit calculating the first detection value, the second detection value, and the count value to generate a first slope in response to the operation voltage being equal to the second detection value, and estimating a power-off speed at which the operation voltage drops to a reset voltage according to the first slope; and a processing circuit outputting the power-off speed to a test machine in a test mode, wherein:

the test machine determines whether a power circuit is working normally according to the power-off speed;

the power circuit provides the operation voltage;

in response to the power-off speed being lower than a predetermined power-off speed, the processing circuit executes a reset operation; and in response to the power-off speed not being lower than the predetermined power-off speed, the processing circuit updates a first memory.

11. The control circuit as claimed in claim 10, wherein the first detection value is higher than the second detection value, and the second detection value is higher than the reset voltage.

12. The control circuit as claimed in claim 10, wherein:

in response to the operation voltage being equal to the first detection value, the detection circuit sets a value of a first interruption flag to a specific value, in response to the operation voltage being equal to the second detection value, the detection circuit sets a value of a second interruption flag to the specific value, and in response to the value of the first interruption flag being equal to the specific value, the counter circuit starts adjusting the count value.

13. The control circuit as claimed in claim 10, wherein in response to the power-off speed not being lower than the predetermined power-off speed, the processing circuit moves data stored in a second memory to the first memory.

14. The control circuit as claimed in claim 10, wherein the reset operation is performed to reset at least one register.

15. The control circuit as claimed in claim 10, wherein:
in response to the operation voltage being within the first detection value and the second detection value:
the calculation circuit calculates the first detection value, the second detection value, and the count value to generate a second slope,
the processing circuit accesses the second memory to generate first update data according to the second slope,
after the first update data is generated, in response to the operation voltage being within the first detection value and the second detection value:
the calculation circuit calculates the first detection value, the second detection value, and the count value to generate a third slope, and
the processing circuit accesses the second memory to generate second update data according to the third slope,
in response to the operation voltage being equal to the second detection value, the processing circuit writes the first update data and the second update data into the first memory.

16. The control circuit as claimed in claim 15, wherein:
in response to the third slope being less than the second slope, the amount of second update data is larger than the amount of first update data, and
in response to the third slope being higher than the second slope, the amount of second update data is less than the amount of first update data.

17. The control circuit as claimed in claim 14, wherein in the test mode, the processing circuit stores the power-off speed, and the power-off speed serves as the predetermined power-off speed.

18. The control circuit as claimed in claim 10, wherein the calculation circuit calculates a difference between the first detection value and the second detection value and converts the count value to a count time, and the calculation circuit divides the difference by the count time to generate a calculation result, and the calculation result serves as the first slope.

* * * * *